(12) United States Patent
Gazit et al.

(10) Patent No.: US 9,042,300 B2
(45) Date of Patent: May 26, 2015

(54) DOWNLINK INDICATOR CHANNEL PROCESSING IN A WIRELESS SYSTEM BASE STATION

(75) Inventors: Ido Gazit, Haifa (IL); Shai Kalfon, Hod Hasharon (IL); Eran Goldstein, Raanana (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 262 days.

(21) Appl. No.: 13/353,664

(22) Filed: Jan. 19, 2012

(65) Prior Publication Data

US 2013/0188553 A1 Jul. 25, 2013

(51) Int. Cl.
*H04W 4/00* (2009.01)
*H04L 1/00* (2006.01)
*H04L 1/18* (2006.01)

(52) U.S. Cl.
CPC ............ *H04L 1/0067* (2013.01); *H04L 1/0071* (2013.01); *H04L 1/0073* (2013.01); *H04L 1/1812* (2013.01); *H04L 1/1861* (2013.01)

(58) Field of Classification Search
CPC .. H04B 1/7107; H04L 1/0067; H04L 1/0071; H04L 1/0073; H04L 1/1812; H04L 1/1861
See application file for complete search history.

(56) References Cited

U.S. PATENT DOCUMENTS

| | | | |
|---|---|---|---|
| 2007/0025469 A1* | 2/2007 | Dominique et al. | 375/316 |
| 2009/0147743 A1 | 6/2009 | Parkvall et al. | |
| 2009/0219181 A1* | 9/2009 | Li et al. | 341/102 |
| 2010/0034312 A1 | 2/2010 | Muharemovic et al. | |
| 2010/0332937 A1 | 12/2010 | Dai et al. | |
| 2011/0176502 A1 | 7/2011 | Chung et al. | |
| 2011/0206014 A1 | 8/2011 | Lee et al. | |
| 2013/0215858 A1* | 8/2013 | Jang et al. | 370/329 |

OTHER PUBLICATIONS

Hyung G. Myung Rgnyung, "Technical Overview of 3GPP LTE," May 2008, 53 pages.

(Continued)

*Primary Examiner* — Chi H Pham
*Assistant Examiner* — Raul Rivas
(74) *Attorney, Agent, or Firm* — Suiter Swantz pc llo

(57) ABSTRACT

A transmitter comprises indicator channel processing circuitry configured to process indicator channel codewords for transmission in a base station of a wireless system. The indicator channel processing circuitry performs a plurality of processing operations on the indicator channel codewords in a specified processing sequence, with the plurality of processing operations comprising at least modulation, scrambling, spreading and combining. In the specified processing sequence, the scrambling operation is performed for at least a given one of the indicator channel codewords prior to the modulation and spreading operations for that codeword or subsequent to the combining operation for that codeword. For example, the specified processing sequence may comprise the scrambling, modulation, spreading and combining operations performed in that order for at least the given codeword, or the modulation, spreading, combining and scrambling operations performed in that order for at least the given codeword.

21 Claims, 3 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, Mar. 2010, 85 pages.

E. Dahlman et al., "HSPA and LTE for Mobile Broadband," 3G Evolution, 2nd Edition, http://books.google.com/books?hl=en&lr=&id=cmMgp4j23D0C&oi=fnd&pg=PP2&dq=3gpp+lte+physical+hybrid+ARQ+indicator+channel&ots=KCcc2TqtX-&sig=92cQtVeRDM1_XmYKGpYrlYehgek#v=onepage&q&f=false, 2008, p. 337.

* cited by examiner

DOWNLINK INDICATOR CHANNEL PROCESSING IN A WIRELESS SYSTEM BASE STATION

BACKGROUND

Wireless systems in the cellular context are currently being implemented using fourth generation (4G) standards. These 4G standards include Long Term Evolution (LTE) standards developed by the 3G Partnership Project (3GPP). LTE cellular systems make use of an Internet protocol (IP) based packet core referred to as Evolved Packet Core (EPC). The EPC interconnects multiple base stations within the system. A given base station, also referred to as an evolved Node B (eNB), communicates over an air interface with multiple user terminals. Individual user terminals are also referred to as user equipment (UE).

The air interface between an eNB and UE in an LTE cellular system includes a variety of uplink and downlink channels. See, for example, 3GPP TS 36.211, V9.1.0, 3rd Generation Partnership Project Technical Specification, Group Radio Access Network, Evolved Universal Terrestrial Radio Access (E-UTRA), Physical Channels and Modulation (Release 9), March 2010, which is incorporated by reference herein. One such channel is a downlink hybrid automatic repeat request (ARQ) channel referred to as PHICH ("Physical Hybrid ARQ Indicator Channel").

In conventional PHICH processing, hybrid ARQ indicator (HI) codewords from a given PHICH group are each modulated, then subject to spreading and scrambling operations, then mapped onto a number of layers, and then precoded. The precoded layers from multiple PHICH codewords are then combined in a PHICH symbol combiner. Each PHICH group can hold up to eight codewords. Additional details regarding these and other conventional PHICH processing operations can be found in Section 6.9 of the above-cited 3GPP TS 36.211 document, at pages 57-61.

LTE system channels such as PHICH are subject to strict latency requirements. This can unduly increase the memory and computational requirements of the base station, leading to higher costs and increased power consumption.

SUMMARY

Illustrative embodiments of the invention provide improved processing of PHICH channels or other types of indicator channels in a base station of a wireless system, such as an LTE wireless cellular system. For example, one or more such embodiments may be configured to modify the ordering of certain PHICH processing operations relative to conventional arrangements, in a manner that substantially reduces PHICH processing time. This makes it easier to meet strict LTE latency requirements, while also reducing base station cost and power consumption.

In one embodiment, a base station transmitter in a wireless system comprises indicator channel processing circuitry configured to process indicator channel codewords for transmission from the base station to user terminals. The indicator channel processing circuitry performs a plurality of processing operations on the indicator channel codewords in a specified processing sequence, with the plurality of processing operations comprising at least modulation, scrambling, spreading and combining. In the specified processing sequence, the scrambling operation is performed for at least a given one of the indicator channel codewords prior to the modulation and spreading operations for that codeword or subsequent to the combining operation for that codeword.

For example, the specified processing sequence may comprise the scrambling, modulation, spreading and combining operations performed in that order for at least the given codeword, or the modulation, spreading, combining and scrambling operations performed in that order for at least the given codeword. In these and other processing sequences, certain of the processing operations may overlap with one another. As one possible instance of such overlapping of processing operations, at least the modulation and spreading operations may be at least partially overlapped with one another.

In other embodiments, the processing operations may further comprise repetition, layer mapping and precoding operations, and the specified processing sequence may comprise one of the following two sequences: repetition, scrambling, modulation, spreading, combining, layer mapping and precoding operations performed in that order, and repetition, modulation, spreading, combining, scrambling, layer mapping and precoding operations performed in that order.

As a further example, the indicator channel processing circuitry in one or more embodiments may comprise, for each of a plurality of indicator channels in a group of indicator channels, a repetition and scrambling module configured to receive indicator channel codewords and to generate scrambled bits from the codewords, and a modulation and spreading module configured to receive the scrambled bits and to generate spread symbols from the scrambled bits. The indicator channel processing circuitry in an embodiment of this type may further comprise a symbol combiner shared by each of the indicator channels in the group and configured to combine spread symbols from the modulation and spreading modules associated with the respective indicator channels, and a layer mapping and precoding module configured to receive the combined symbols from the symbol combiner and to generate outputs corresponding to respective ones of a plurality of precoded layers.

As yet another example, the indicator channel processing circuitry in one or more embodiments may comprise, for each of a plurality of indicator channels in a group of indicator channels, a repetition module configured to receive indicator channel codewords and to generate repeated bits from the codewords, and a modulation and spreading module configured to receive the repeated bits and to generate spread symbols from the repeated bits. The indicator channel processing circuitry in an embodiment of this type may further comprise a symbol combiner shared by each of the indicator channels in the group and configured to combine spread symbols from the modulation and spreading modules associated with the respective indicator channels, a scrambling module configured to receive the combined symbols from the symbol combiner and to generate scrambled combined symbols, and a layer mapping and precoding module configured to receive the scrambled combined symbols from the scrambling module and to generate outputs corresponding to respective ones of a plurality of precoded layers.

DETAILED DESCRIPTION

Embodiments of the invention will be illustrated herein in conjunction with exemplary wireless systems which include one or more base stations each configured to communicate with multiple user terminals in a particular manner. It should be understood, however, that the disclosed techniques are more generally applicable to any wireless system application in which it is desirable to provide improved processing of PHICH channels or other types of indicator channels. For example, the invention can be implemented in a wide variety of other types of wireless systems, including systems outside of the LTE cellular context, such as WiMAX systems, Wi-Fi systems, etc.

Figure 1:
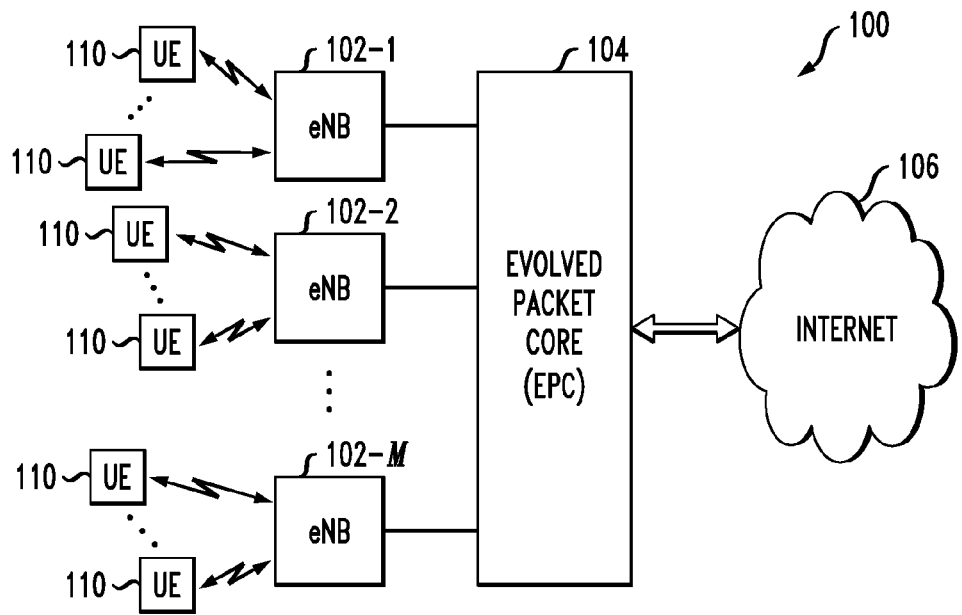
FIG. 1 is a block diagram showing an illustrative embodiment of a wireless system that incorporates improved downlink indicator channel processing.

FIG. 1 shows a wireless communication system 100 in an illustrative embodiment. The system 100 includes a plurality of base stations 102-1, 102-2, . . . 102-M, each arranged to communicate with multiple user terminals 110. It is assumed without limitation that the wireless system 100 comprises an LTE cellular system. The base stations 102 are therefore also referred to in this embodiment as respective evolved Node B (eNB) elements, and the user terminals 110 are also referred to as user equipment (UE). The base stations 102 are coupled to an evolved packet core (EPC) 104, which may include, for example, one or more conventional gateways and mobility management entities of a type well known in the art. The EPC 104 provides connectivity between the base stations 102 and one or more external networks, in this embodiment illustratively comprising Internet 106.

A given one of the user terminals 110 may comprise, by way of example, a mobile telephone, a computer, or any other type of user communication device. The term "user terminal" as used herein is therefore intended to be construed broadly, so as to encompass a variety of different types of mobile stations, subscriber stations or, more generally, communication devices.

It is to be appreciated that the system 100 as illustrated in FIG. 1 is just one exemplary configuration of a wireless cellular system, and numerous alternative configurations of system elements may be used. For example, other embodiments of the invention may include additional or alternative elements of a type commonly associated with conventional system implementations.

The base stations 102 and user terminals 110 in the system 100 communicate over uplink and downlink channels of the type specified in the 3GPP LTE standards documents, such as the above-cited 3GPP TS 36.211 document. These channels include at least one physical hybrid ARQ indicator channel (PHICH). Embodiments of the invention configure one or more of the base stations 102 so as implement improved processing of PHICH channels. Such PHICH channels may be viewed as examples of what are more generally referred to herein as "indicator channels." In these embodiments, the ordering of certain PHICH processing operations is modified relative to conventional arrangements, in a manner that substantially reduces PHICH processing time, thereby making it easier to meet strict LTE latency requirements, while also reducing base station cost and power consumption.

Figure 2:
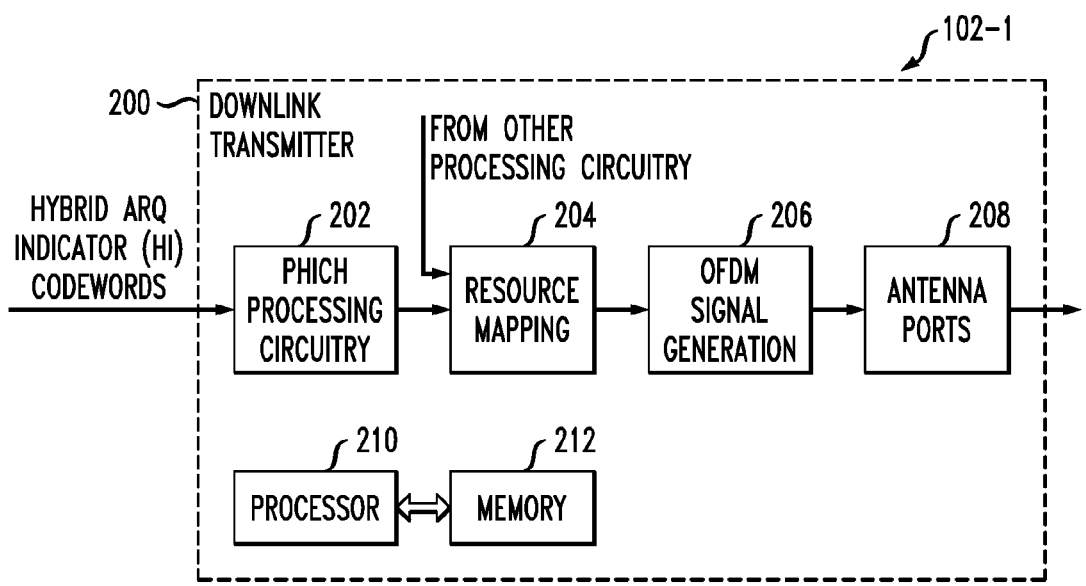
FIG. 2 shows a more detailed view of a portion of a base station transmitter of the FIG. 1 system.

FIG. 2 shows a downlink transmitter 200 in a particular one of the base stations 102-1. The transmitter 200 comprises PHICH processing circuitry 202 for providing the above-noted improved processing of PHICH channels. One or more other base stations 102 may also be configured to include a similar downlink transmitter. Each of the base stations 102 may be further assumed to include additional uplink and downlink transceiver elements and related components of a conventional nature for supporting communications over other types of channels within the system 100.

The PHICH processing circuitry 202 may be viewed as an example of what is more generally referred to herein as "indicator channel processing circuitry" that is configured to process indicator channel codewords for transmission in a base station of a wireless system. As will be described below in conjunction with the illustrative embodiments, such indicator channel processing circuitry performs a plurality of processing operations on indicator channel codewords in a specified processing sequence, with the processing operations comprising at least modulation, scrambling, spreading and combining. More particularly, in the specified processing sequence the scrambling operation may be performed prior to the modulation and spreading operations, as in the illustrative embodiment of FIG. 3, or subsequent to the combining operation, as in the illustrative embodiment of FIG. 4. Both of these exemplary arrangements lead to significantly reduced processing time and therefore improved overall performance relative to the conventional PHICH processing as set forth in the above-cited 3GPP TS 36.211 document.

As shown in FIG. 2, the PHICH processing circuitry 202 receives hybrid ARQ indicator (HI) codewords associated with one or more PHICH groups. The HI codewords are also referred to herein as PHICH codewords. Each PHICH group in this embodiment is assumed to comprise N indicator channels, denoted HI 1 through HI N, where N may take on values up to and including eight in the 3GPP TS 36.211 document but may take on other values in embodiments of the present invention. Also, there may be K different PHICH groups that are processed by the PHICH processing circuitry 202, where a particular one of the groups is indexed by the variable k, where k=1, 2, . . . K.

The outputs of the PHICH processing circuitry 202 in the present embodiment comprise processed indicator channel codewords that may be characterized as being in the form of multiple precoded layers. The precoded layers are applied as inputs to a resource mapping module 204, which may also map inputs for other channels from other processing circuitry not specifically shown. After the resource mapping in module 204, corresponding orthogonal frequency division multiplexed (OFDM) signals are generated in OFDM signal generation module 206, and the resulting OFDM signals are applied to antenna ports 208 for transmission over an air interface of the system 100 to the user terminals 110. Such resource mapping and OFDM signal generation operations may be performed in a well-known conventional manner. In other embodiments, a variety of other techniques may be used to transmit indicator channel codewords between a base station and user terminals.

The downlink transmitter 200 further comprises a processor 210 coupled to a memory 212. At least a portion of the PHICH processing circuitry 202 may be implemented as one or more processing modules, each comprising computer program code that is stored in the memory 212 and executed by the processor 210. The processor and memory elements of the transmitter 200 need not be dedicated exclusively to the transmitter 200 and accordingly may be shared with one or more other transmitters, receivers or other components of the base station 102-1. For example, these processor and memory elements may represent respective generalized processing and memory resources of the base station that perform operations for multiple base station components.

The processor 210 may comprise, for example, one or more microprocessors, application-specific integrated circuits (ASICs), field-programmable gate arrays (FPGAs), digital signal processors (DSPs), systems-on-chip (SOCs) or other types of processing devices, as well as portions or combinations of such elements.

The memory 212 may comprise, for example, electronic memory such as random access memory (RAM) or read-only memory (ROM), magnetic memory, optical memory or other types of storage elements, as well as portions or combinations of such elements. System memory elements such as memory 212 are considered examples of what are also referred to herein as computer-readable storage media that store computer program code, or more generally computer program products having executable program code embodied therein. Such program code when executed in the base station 102-1 of the wireless system 100 causes the base station to perform at least a portion of the functionality of the downlink transmitter 200, and more particularly to implement at least a portion of the PHICH codeword processing. Thus, PHICH processing circuitry as that term is used herein may encompass circuitry associated with processor 210 and memory 212.

Illustrative embodiments of the PHICH processing circuitry 202 will now be described in greater detail with reference to FIGS. 3 and 4. In each of these embodiments, the PHICH processing circuitry performs a plurality of processing operations on the HI codewords in a specified processing sequence, with the processing operations comprising at least modulation, scrambling, spreading and combining. More particularly, in the FIG. 3 embodiment, the scrambling operation is performed prior to the modulation and spreading operations, while in the FIG. 4 embodiment the scrambling operation is performed subsequent to the combining operation.

Figure 3:
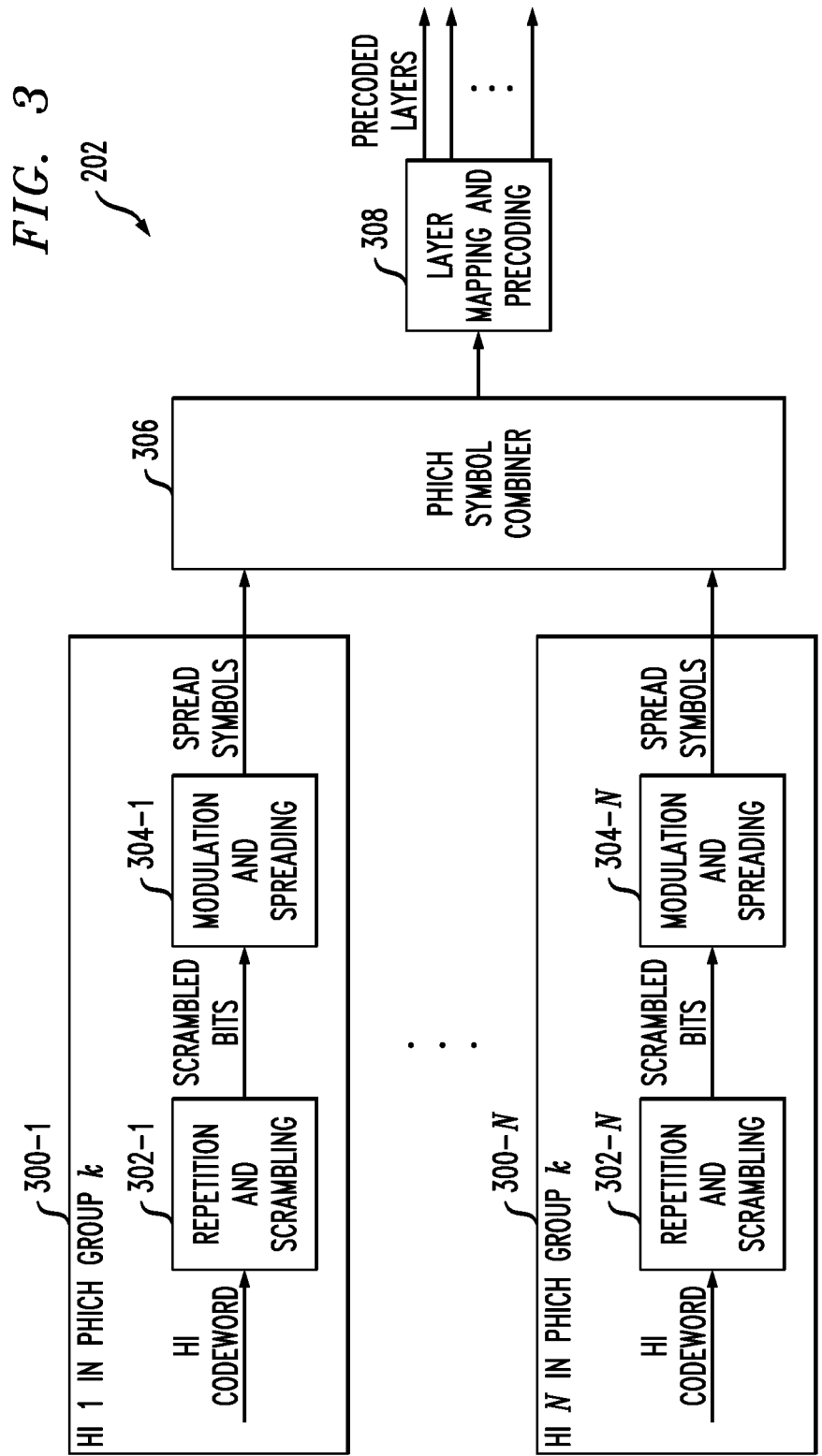
FIGS. 3 and 4 show different embodiments of downlink indicator channel processing circuitry that may be implemented in the base station of FIG. 2.
Figure 4:
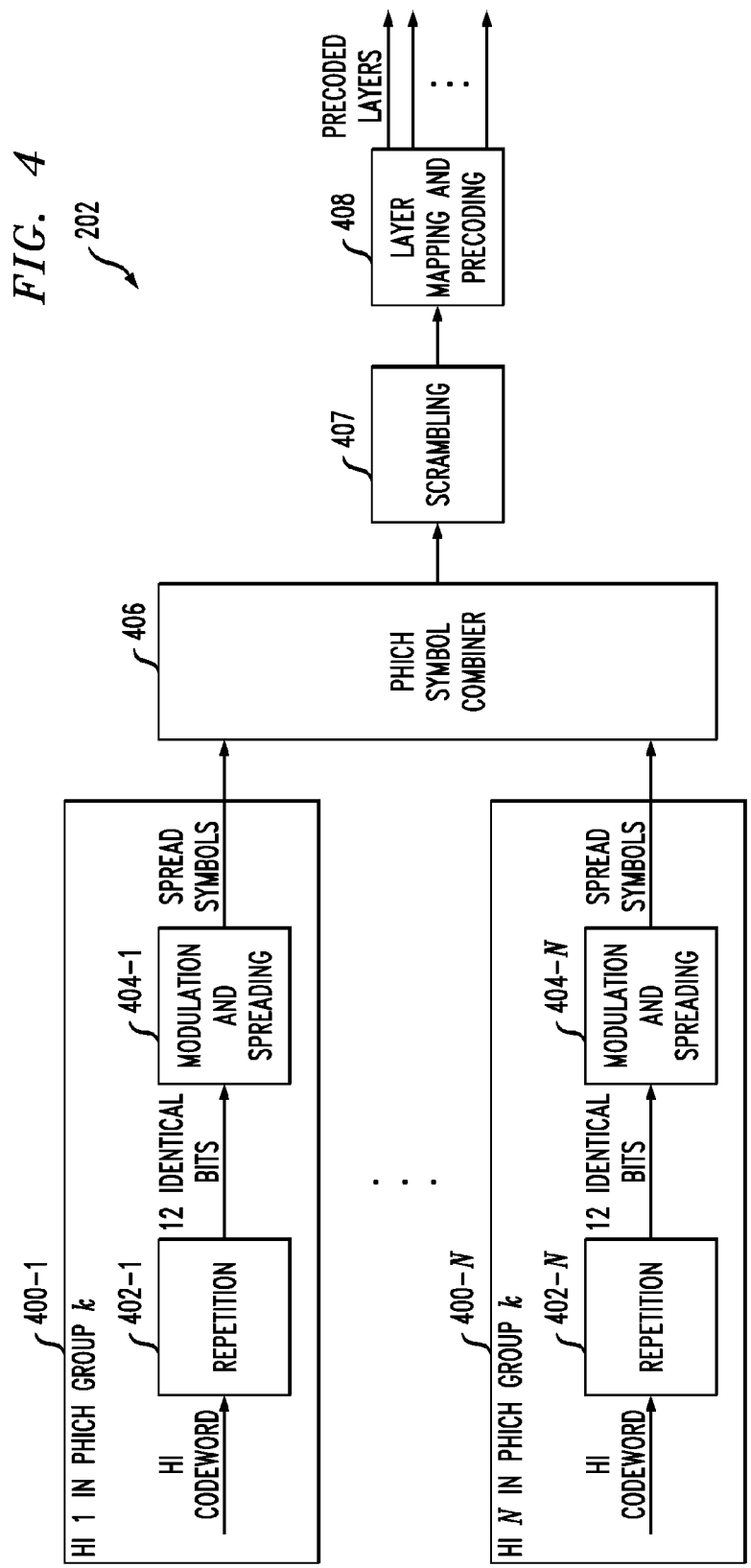

Thus, in the FIG. 3 embodiment, the specified processing sequence comprises at least the scrambling, modulation, spreading and combining operations performed in that order, and in the FIG. 4 embodiment, the specified processing sequence comprises at least the modulation, spreading, combining and scrambling operations performed in that order. This ordering of operations should not be viewed as precluding at least partial overlap of certain of the processing operations. For example, at least the modulation and spreading operations in a given embodiment may be at least partially overlapped with one another. Despite any such overlap, scrambling is still performed in these embodiments prior to the modulation and spreading operations, or subsequent to the combining operation.

It should be noted in this regard that the ordering of the processing operations in the illustrative embodiments may be viewed as referring to ordering with respect to a given codeword. Accordingly, performing scrambling prior to modulation and spreading may be viewed as performing scrambling for a given codeword prior to modulating and spreading that codeword.

Referring now more specifically to FIG. 3, the PHICH processing circuitry 202 comprises initial module sets 300-1 through 300-N, with one such module set associated with each of the N indicator channels within a given PHICH group denoted as group k. In this embodiment, the scrambling operation is performed on bits of a given one of the HI codewords prior to performing the modulation and spreading operations on that codeword. In addition, because the scrambling operation in this embodiment is performed prior to spreading, a repetition operation is performed on the bits of the given indicator channel codeword prior to performing the scrambling operation on that codeword. As will become apparent, the processing operations in the FIG. 3 embodiment more particularly comprise repetition, layer mapping and precoding operations, and the specified processing sequence comprises the repetition, scrambling, modulation, spreading, combining, layer mapping and precoding operations performed in that order.

The PHICH processing circuitry 202 as shown in FIG. 3 comprises, for each of the N indicator channels in the group k of indicator channels, a repetition and scrambling module 302 configured to receive indicator channel codewords and to generate scrambled bits from those codewords, and a modulation and spreading module 304 configured to receive the scrambled bits and to generate spread symbols from the scrambled bits. The modules 302 and 304 for a given one of the N indicator channels are part of the corresponding module set 300. Thus, for example, modules 302-1 and 304-1 are part of the module set 300-1 for the first indicator channel of group k, and modules 302-N and 304-N are part of the module set 300-N for the final indicator channel of group k.

In the FIG. 3 embodiment, as indicated above, the scrambling operation is performed prior to spreading, and thus a repetition operation is performed prior to scrambling. For example, assume that a given HI codeword comprises three identical bits, either 000 or 111. In a conventional arrangement, each bit of the codeword is modulated into a symbol, such that after modulation there are three symbols representing the codeword, and the symbols are then spread by a factor of four to convert the three symbols into 12 spread symbols, which is followed by the scrambling operation performed on the 12 spread symbols. Because scrambling is done prior to modulation and spreading in the FIG. 3 embodiment, the repetition operation takes as input the three identical bits comprising the given HI codeword and outputs 12 identical bits, either 000000000000 or 111111111111, so as to provide a 12-bit output to the scrambling operation for each codeword. The same type of repetition operation is performed in module 402 of the FIG. 4 embodiment, as will be described.

The PHICH processing circuitry 202 further comprises a symbol combiner 306 shared by each of the N indicator channels in group k. The symbol combiner 306 is configured to combine spread symbols from the modulation and spreading modules 304 associated with the respective indicator channels. Also included in the PHICH processing circuitry 202 is a layer mapping and precoding module 308 configured to receive the combined symbols from the symbol combiner 306 and to generate outputs corresponding to respective ones of a plurality of precoded layers, suitable for resource mapping and signal generation in transmitter 200.

These outputs of PHICH processing circuitry 202 are consistent with those specified by the above-cited 3GPP TS 36.211 document, but processing time in generating the outputs is significantly reduced relative to the conventional arrangement. For example, the amount of processing required per time slot in this embodiment is reduced at least in part because the number of required mapping and precoding executions is reduced by a factor corresponding to the number of indicator channels in the group.

With reference now to FIG. 4, the PHICH processing circuitry 202 comprises initial module sets 400-1 through 400-N, with one such module set associated with each of the N indicator channels within a given PHICH group denoted as group k. In this embodiment, the scrambling operation is performed on combined symbols from multiple HI codewords associated with respective indicator channels in group k, subsequent to performing the combining operation for those codewords. As will become apparent, the processing operations in the FIG. 4 embodiment more particularly comprise repetition, layer mapping and precoding operations, and the specified processing sequence comprises the repetition, modulation, spreading, combining, scrambling, layer mapping and precoding operations performed in that order.

The PHICH processing circuitry 202 as shown in FIG. 4 comprises, for each of the N indicator channels in the group k of indicator channels, a repetition module 402 configured to receive indicator channel codewords and to generate repeated bits from those codewords, and a modulation and spreading module 404 configured to receive the repeated bits and to generate spread symbols from the repeated bits. The repeated bits generated by the repetition module 402 comprise 12 identical bits, either 000000000000 or 111111111111, for each of the codewords, as mentioned previously in the context of the FIG. 3 embodiment. The modules 402 and 404 for a given one of the N indicator channels are part of the corresponding module set 400. Thus, for example, modules 402-1 and 404-1 are part of the module set 400-1 for the first indicator channel of group k, and modules 402-N and 404-N are part of the module set 400-N for the final indicator channel of group k.

The PHICH processing circuitry 202 further comprises a symbol combiner 406 shared by each of the N indicator channels in group k. The symbol combiner 406 is configured to combine spread symbols from the modulation and spreading modules 404 associated with the respective indicator channels. Also included in the PHICH processing circuitry 202 is a scrambling module 407 configured to receive the combined symbols from the symbol combiner and to generate scrambled combined symbols, and a layer mapping and precoding module 408 configured to receive the scrambled combined symbols from the scrambling module 407 and to generate outputs corresponding to respective ones of a plurality of precoded layers, suitable for resource mapping and signal generation in transmitter 200.

As in the FIG. 3 embodiment, these outputs of PHICH processing circuitry 202 in the FIG. 4 embodiment are consistent with those specified by the above-cited 3GPP TS 36.211 document, but processing time in generating the outputs is significantly reduced relative to the conventional arrangement. For example, the amount of processing required per time slot in the FIG. 4 embodiment is reduced at least in part because the number of required scrambling executions is reduced by a factor corresponding to the number of indicator channels in the group.

Additional details regarding exemplary PHICH processing operations such as modulation, scrambling, spreading, combining, layer mapping and precoding that can be adapted for use in the embodiments of FIGS. 3 and 4 may be found in the above-cited 3GPP TS 36.211 document. Alternatively, other types and arrangements of these and other processing operations may be used to process indicator channel codewords as described herein.

It is to be appreciated that the particular indicator channel processing circuitry arrangements and associated processing operations as shown in FIGS. 3 and 4 may be varied in other embodiments. Numerous alternative arrangements of hardware, software and firmware in any combination may be used to implement the described indicator channel processing functionality.

Also, although described primarily in the context of PHICH processing in an LTE wireless cellular system, the disclosed techniques can be adapted for use with a wide variety of other types of indicator channels used for communication between a base station and user terminals in a wireless system. Such indicator channels may comprise, for example, other types of ARQ channels, although it is to be appreciated that the term "indicator channel" as used herein is not limited to ARQ channels.

Indicator channel processing circuitry or portions thereof in accordance with embodiments of the invention may be implemented in the form of one or more integrated circuits suitable for installation within base station equipment. Thus, PHICH processing circuitry 202 may be implemented as a separate integrated circuit, or as a combination of multiple integrated circuits.

The term "transmitter" as used herein is intended to be broadly construed, so as to encompass, for example, a set of PHICH processing modules and one or more related elements such as resource mappers and signal generators. It may but need not encompass additional elements associated with transmission of indicator channel codewords, such as upconverters, filters, antennas, etc. A base station transmitter may therefore be implemented in the form of an integrated circuit.

In a given integrated circuit implementation, identical die are typically formed in a repeated pattern on a surface of a semiconductor wafer. Each die may include at least a portion of indicator channel processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

Again, it should be emphasized that the embodiments described herein are intended to be illustrative only. For example, the particular arrangement of base stations, user terminals, networks and other system elements as shown in FIG. 1 may be varied in alternative embodiments. Also, other types of circuitry elements or processing modules may be used to implement indicator channel processing functionality as disclosed herein. These and numerous other alternative embodiments within the scope of the following claims will be readily apparent to those skilled in the art.

What is claimed is:

1. An apparatus comprising:
a transmitter comprising indicator channel processing circuitry configured to process indicator channel codewords for transmission in a base station of a wireless system;
wherein the indicator channel processing circuitry performs a plurality of processing operations on the indicator channel codewords in a specified processing sequence, the plurality of processing operations comprising at least modulation, scrambling, spreading and combining;
wherein in the specified processing sequence the scrambling operation is performed for at least a given one of the indicator channel codewords subsequent to the combining operation for that codeword; and
wherein the specified processing sequence comprises at least the modulation, spreading, combining and scrambling operations performed in that order for at least the given codeword.

2. The apparatus of claim 1 wherein the indicator channel codewords comprise respective physical hybrid ARQ indicator channel (PHICH) codewords.

3. The apparatus of claim 1 wherein the scrambling operation is performed on combined symbols from a plurality of indicator channel codewords associated with respective indicator channels in a group of said indicator channels subsequent to performing the combining operation for those codewords.

4. The apparatus of claim 1 wherein at least the modulation and spreading operations are at least partially overlapped with one another for the given codeword.

5. An apparatus comprising:
a transmitter comprising indicator channel processing circuitry configured to process indicator channel codewords for transmission in a base station of a wireless system;
wherein the indicator channel processing circuitry performs a plurality of processing operations on the indicator channel codewords in a specified processing sequence, the plurality of processing operations comprising at least modulation, scrambling, spreading and combining;
wherein in the specified processing sequence the scrambling operation is performed for at least a given one of the indicator channel codewords prior to the modulation, spreading and combining operations for that codeword; and
wherein the processing operations further comprise at least repetition, layer mapping and precoding operations, and wherein the specified processing sequence comprises:
at least the repetition, scrambling, modulation, spreading, combining, layer mapping and precoding operations performed in that order for the given codeword.

6. The apparatus of claim 5 wherein the indicator channel processing circuitry comprises, for each of a plurality of indicator channels in a group of indicator channels, at least the following modules:
a repetition and scrambling module configured to receive indicator channel codewords and to generate scrambled bits from said codewords; and
a modulation and spreading module configured to receive the scrambled bits and to generate spread symbols from the scrambled bits.

7. The apparatus of claim 6 wherein the indicator channel processing circuitry further comprises a symbol combiner shared by each of the indicator channels in the group and configured to combine spread symbols from the modulation and spreading modules associated with the respective indicator channels.

8. The apparatus of claim 7 wherein the indicator channel processing circuitry further comprises a layer mapping and precoding module configured to receive the combined symbols from the symbol combiner and to generate outputs corresponding to respective ones of a plurality of precoded layers.

9. The apparatus of claim 1 wherein the indicator channel processing circuitry comprises, for each of a plurality of indicator channels in a group of indicator channels, at least the following modules:
a repetition module configured to receive indicator channel codewords and to generate repeated bits from said codewords; and
a modulation and spreading module configured to receive the repeated bits and to generate spread symbols from the repeated bits.

10. The apparatus of claim 9 wherein the indicator channel processing circuitry further comprises a symbol combiner shared by each of the indicator channels in the group and configured to combine spread symbols from the modulation and spreading modules associated with the respective indicator channels.

11. The apparatus of claim 10 wherein the indicator channel processing circuitry further comprises:
a scrambling module configured to receive the combined symbols from the symbol combiner and to generate scrambled combined symbols; and
a layer mapping and precoding module configured to receive the scrambled combined symbols from the scrambling module and to generate outputs corresponding to respective ones of a plurality of precoded layers.

12. An integrated circuit comprising the apparatus of claim 1.

13. A base station comprising the apparatus of claim 1.

14. The apparatus of claim 1 wherein the transmitter further comprises:
a processor; and
a memory coupled to the processor;
wherein at least a portion of the indicator channel processing circuitry is implemented as one or more processing modules each comprising computer program code that is stored in the memory and executed by the processor.

15. A method comprising:
processing indicator channel codewords in a base station of a wireless system; and
transmitting the processed indicator channel codewords from the base station;
wherein the processing step further comprises performing a plurality of processing operations on the indicator channel codewords in a specified processing sequence, the plurality of processing operations comprising at least modulation, scrambling, spreading and combining;
wherein in the specified processing sequence the scrambling operation is performed for at least a given one of the indicator channel codewords to the combining operation for that codeword; and
wherein the specified processing sequence comprises at least the modulation, spreading, combining and scrambling operations performed in that order for the given codeword.

16. A method comprising:
processing indicator channel codewords in a base station of a wireless system; and
transmitting the processed indicator channel codewords from the base station;
wherein the processing step further comprises performing a plurality of processing operations on the indicator channel codewords in a specified processing sequence, the plurality of processing operations comprising at least modulation, scrambling, spreading and combining;
wherein in the specified processing sequence the scrambling operation is performed for at least a given one of the indicator channel codewords prior to the modulation, spreading and combining operations for that codeword; and
wherein the processing operations further comprise at least repetition, layer mapping and precoding operations, and wherein the specified processing sequence comprises:
at least the repetition, scrambling, modulation, spreading, combining, layer mapping and precoding operations performed in that order for the given codeword.

17. A non-transitory computer-readable storage medium having executable computer program code embodied therein, wherein the computer program code when executed in the base station of the wireless system causes the base station to perform the steps of the method of claim 15.

18. An apparatus comprising:
a transmitter comprising indicator channel processing circuitry configured to process indicator channel codewords for transmission in a base station of a wireless system;
wherein the indicator channel processing circuitry performs a plurality of processing operations on the indicator channel codewords in a specified processing sequence, the plurality of processing operations comprising at least modulation, scrambling, spreading and combining;

wherein in the specified processing sequence the scrambling operation is performed for at least a given one of the indicator channel codewords subsequent to the combining operation for that codeword; and wherein the indicator channel processing circuitry comprises:

a modulation and spreading module for each of a plurality of indicator channels in a group of indicator channels and configured to receive repeated bits generated from said codewords and to generate spread symbols from the repeated bits;

a symbol combiner shared by each of the indicator channels in the group and configured to combine the spread symbols; and a scrambling module configured to receive the combined symbols from the symbol combiner and to generate scrambled combined symbols.

19. The apparatus of claim 5 wherein the scrambling operation is performed on bits of the given indicator channel codeword prior to performing the modulation operation on that codeword.

20. The apparatus of claim 19 wherein a repetition operation is performed on the bits of the given indicator channel codeword prior to performing the scrambling operation on that codeword.

21. The apparatus of claim 5 wherein the specified processing sequence comprises at least the scrambling, modulation, spreading and combining operations performed in that order for at least the given codeword, with at least the modulation and spreading operations being at least partially overlapped with one another for the given codeword.

* * * * *